United States Patent
Claas

(10) Patent No.: US 8,416,270 B2
(45) Date of Patent: Apr. 9, 2013

(54) LABELING METHOD FOR BLU-RAY DISC

(75) Inventor: Johannes Franciscus Petrus Claas, Hsinchu (TW)

(73) Assignee: Lite-On It Corp., Taipei (TW)

( * ) Notice: Subject to any disclaimer, the term of this patent is extended or adjusted under 35 U.S.C. 154(b) by 160 days.

(21) Appl. No.: 12/969,248

(22) Filed: Dec. 15, 2010

(65) Prior Publication Data
US 2011/0155002 A1   Jun. 30, 2011

(30) Foreign Application Priority Data
Dec. 30, 2009   (CN) .......................... 2009 1 0263711

(51) Int. Cl.
*B41J 2/435* (2006.01)
(52) U.S. Cl.
USPC ........................................................ 347/224
(58) Field of Classification Search .................. 347/224, 347/225; 369/47.54, 47.55, 53.24, 47.23, 369/47.27
See application file for complete search history.

(56) References Cited

U.S. PATENT DOCUMENTS

| | | | | |
|---|---|---|---|---|
| 5,596,564 | A * | 1/1997 | Fukushima et al. | 386/246 |
| 7,269,111 | B2 * | 9/2007 | Koll et al. | 369/53.24 |
| 8,036,085 | B2 * | 10/2011 | Kim et al. | 369/94 |

* cited by examiner

*Primary Examiner* — Hai C Pham
(74) *Attorney, Agent, or Firm* — WPAT PC; Justin King

(57) ABSTRACT

The present invention provides a labeling method for a blu-ray disc, which includes following steps: an initial radius is selected on a blank area of the blu-ray disc, and a pattern is determined; an initial physical sector number is calculated using the initial radius, and the pattern is transformed into a description data; according to the initial physical sector number and a size of the description data, a sequential recorded region of the blu-ray disc is divided into at least two sequential recorded regions, and information of the at least two sequential recorded regions are updated in a table of content, wherein an initial position of one of the sequential recorded regions is the initial physical sector number, and a length of the one of the sequential recorded regions is the size of the description data; the description data is written from the initial physical sector number.

7 Claims, 6 Drawing Sheets

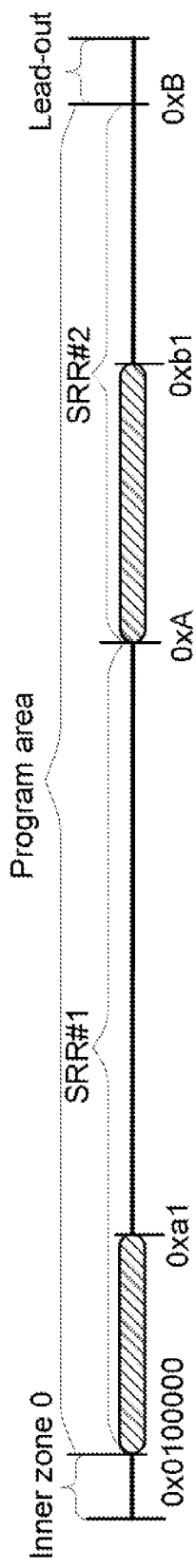
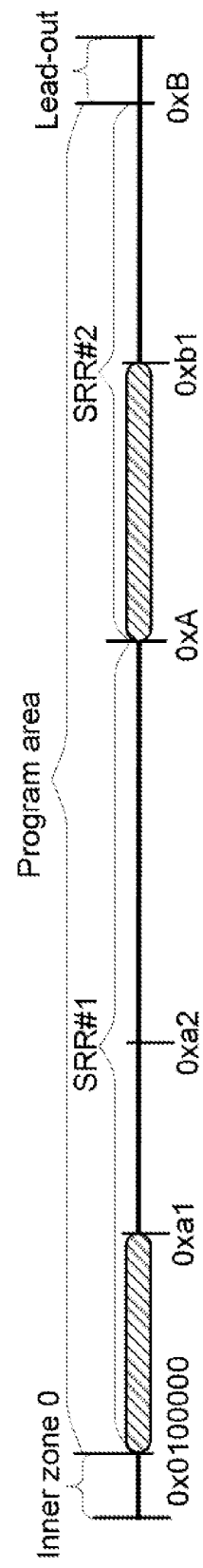
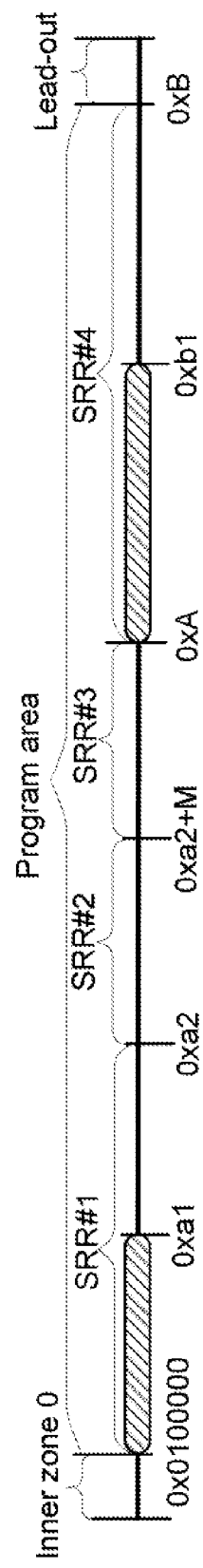
FIG. 2
FIG. 3A
FIG. 3B

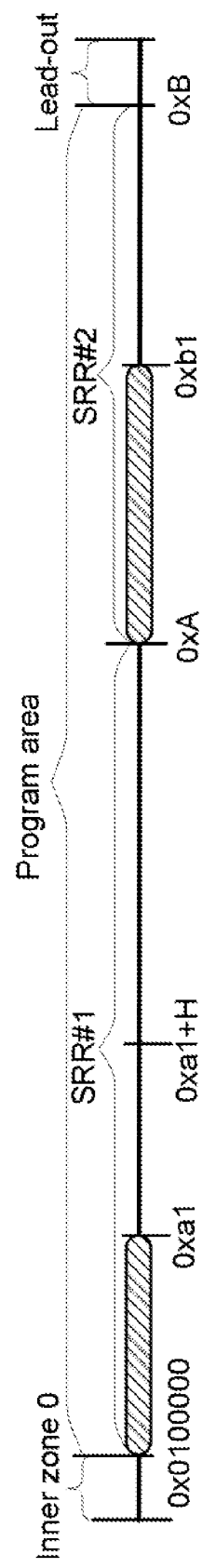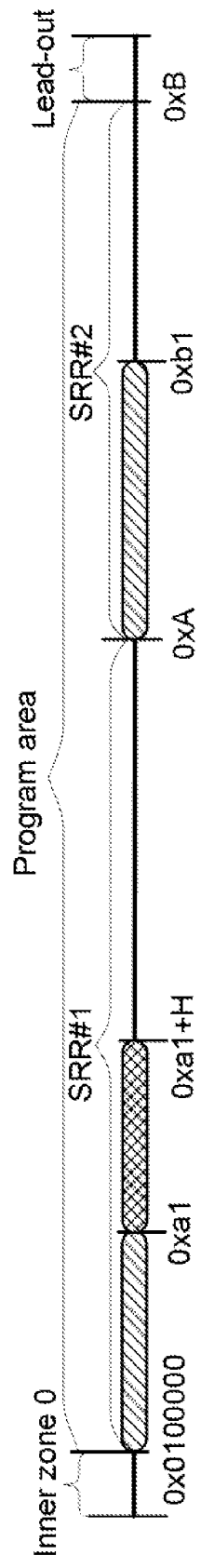
FIG. 5A
FIG. 5B

LABELING METHOD FOR BLU-RAY DISC

This application claims the benefit of People's Republic of China application Serial No. 200910263711.7, filed Dec. 30, 2009, the subject matter of which is incorporated herein by reference.

FIELD OF THE INVENTION

The present invention relates to a labeling method for discs, and more particularly to a labeling method using a label tag technology to form an image on a blu-ray disc.

BACKGROUND OF THE INVENTION

It is well known that a disc generally includes a label side and a data side. The label side of the disc is used to allow a user to write content of the disc thereon. The data side of the disc has a data track to allow a disc drive to write or read data. Generally, when puts the disc into the disc drive, the data side faces a pickup head of the disc drive, thus the pickup head can write data on or read data from the data track.

Lightscribe is a technology developed in recent years. For this technology, a label side of a disc is coated with a specific dye. When the label side faces a pickup head, laser lights emitted from the pickup head focus on the label side, thus generating an image on the label side. Therefore, a user can see the image on the label side to distinguish different discs.

Another image forming technology, be called as label tag technology, has been published recently. In the label tag technology, laser lights emitted from the pickup head focus on a data side of a recordable disc or a rewritable disc, thus generating an image on the data side. The image may be a text-label.

Because the lightscribe technology must use a disc having a label side coated with a specific dye, the unit price of the disc is high. Moreover, a disc drive supporting the lightscribe technology must extra set up a control circuit to generate an image on a label side of the disc. In addition, after a pickup head writes data on a data side, a user must manually reverse the disc to make the label side to face the pickup head, thus an image data can be written on the label side. However, the label tag technology can operate without using of a specific disc, which means the label tag technology can be applied to any recordable discs or any rewritable discs on the market to carry out an action of image description. At the same time, the extra control circuit in the disc drive is unnecessary and the disc is no need to be reversed. Therefore, using the label tag technology to form an image has more advantages than using the lightscribe technology.

In general, when visually observing a complete blank disc with no data thereon, a data side of the disc is a mirror surface. It is well known that a data track of the disc is a spiral track, so that when recording data, a pickup head must write user data in turn along the spiral track from an inner area to an outer area. At the same time, laser lights emitted from the pickup head decrease the reflectivity of the data track. Therefore, when visually observing, the area of the data side written with user data is a dark, non-specular surface.

Referring to FIG. 1A, FIG. 1A is a schematic view showing a user data is written on a data side of a disc 100. An inner area 102 of the disc 100 is written with user data thus becoming a non-specular surface (low reflectivity). A residual area 104 with no data is still a mirror surface (high reflectivity). Referring to FIG. 1B, a straight line is used to represent a whole spiral track, the front part 102 of the spiral track is written with user data, and the rear part 104 of the spiral track is not written with any data.

In general, a compact disc (CD) or a digital video disc (DVD) both uses sessions to divide a track of the disc. A user data written on the disc every time is put in a session. When a user repeatedly writes user data on the disc, the track will have a plurality of continuous sessions. After the user data is completely written on the disc, a residual mirror surface area on the data side can be used to carry out an action of image description. The technology applied to carry out the action of image description is the label tag technology. In the label tag technology, the area written with description data can be seen as another session which must adjacent to the user data.

Referring to FIG. 1C, FIG. 1C is a schematic view showing a pattern generated after describing an image on a data side by the label tag technology. The label tag technology can be used to carry out an action of image description on the residual blank area 104 of the data side. Of course, the action of image description also uses laser lights emitted from the pickup head to decrease the reflectivity of the track, thus the image can be observed by eyes.

Referring to FIG. 1D, a straight line is used to represent a whole spiral track, the front part 102 of the spiral track is written with user data, and the rear part 104 includes a description data 106 used to show image. Due to the specification of a disc, data must be continuously written on the disc. Therefore, shown as FIG. 1D, the description data 106 must be written adjacent to the user data area 102. In addition, after the description data 106 is written on the disc, the disc can not be used to record user data or description data again.

Obviously, the description data of the label tag technology must adjacent to the user data, which means the description data cannot be arbitrarily written on any desired radial positions, but can be written only on an area after the user data. Therefore, the flexibility of the label tag technology for CD and DVD is limited.

SUMMARY OF THE INVENTION

Therefore, the present invention relates to a labeling method for a blu-ray disc. In the method, a description data can be described on any areas of the blu-ray disc except the user data area. In addition, the residual blank area still can be used to write user data again.

An embodiment of the present invention provides a labeling method for a blu-ray disc, which includes following steps: an initial radius is selected on a blank area of the blu-ray disc, and a pattern is determined; an initial physical sector number is calculated using the initial radius, and the pattern is transformed into a description data; according to the initial physical sector number and a size of the description data, a sequential recorded region of the blu-ray disc is divided into at least two sequential recorded regions, and information of the at least two sequential recorded regions are updated in a table of content, wherein an initial position of one of the sequential recorded regions is the initial physical sector number, and a length of the one of the sequential recorded regions is the size of the description data; the description data is written from the initial physical sector number.

Another embodiment of the present invention provides a labeling method for a blu-ray disc, which includes following steps: a sequential recorded region is selected from original sequential recorded regions of the blu-ray disc to write a pattern, the selected sequential recorded region has a final physical sector number; the pattern is transformed into a description data, the description data has a final physical sector number according to a last recorded address of the selected sequential recorded region and a size of the description data; the description data is written adjacent to the final physical sector number of the selected sequential recorded region, then the final physical sector number of the selected sequential recorded region is amended to the final physical sector number of the description data and is updated in a table of content.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which:

FIG. 2 is a schematic view showing a track format of a blu-ray disc;

FIGS. 3A~E are schematic views showing a sequential recorded region (SRR) is divided in a labeling method for a blu-ray disc of the present invention;

FIGS. 5A~B are schematic views showing a sequential recorded region (SRR) in another labeling method for a blu-ray disc of the present invention.

DETAILED DESCRIPTION OF PREFERRED EMBODIMENTS

Figure 1A:
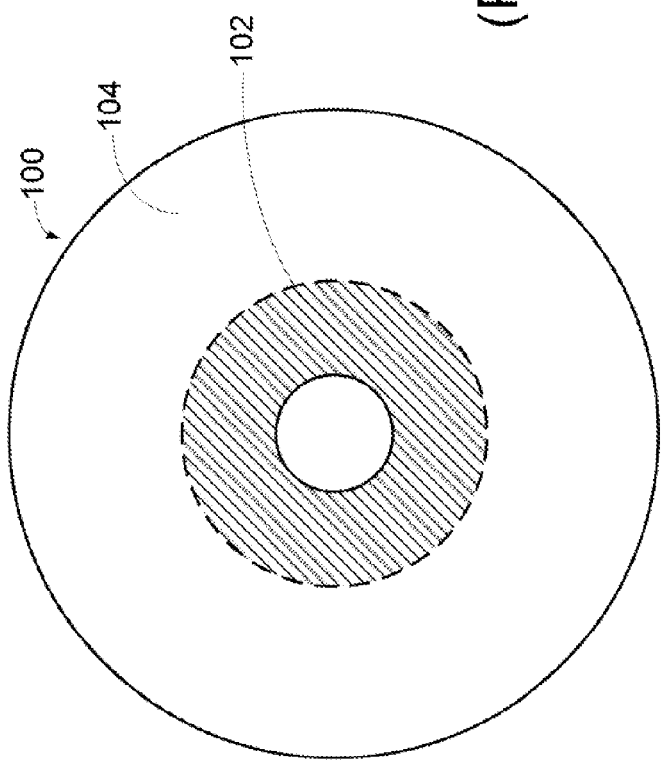
FIG. 1A is a schematic view showing a user data is written on a data side of a disc.
Figure 1B:
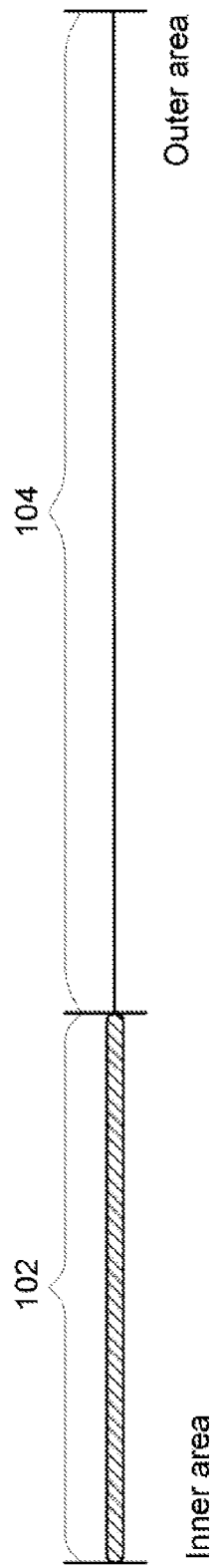
FIG. 1B is a schematic view using a straight line to represent a whole spiral track, corresponding to FIG. 1A.
Figure 1C:
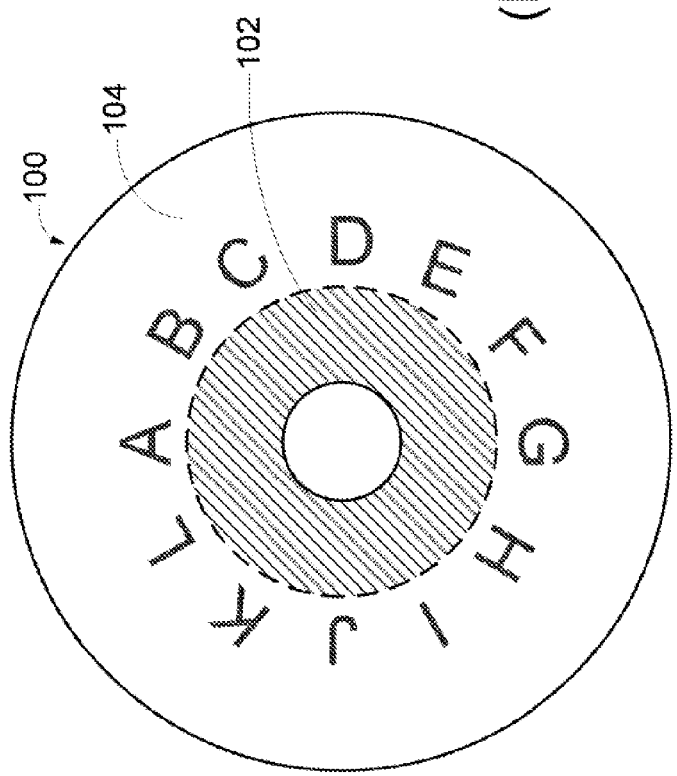
FIG. 1C is a schematic view showing a pattern generated after describing an image on the data side by a label tag technology.
Figure 1D:
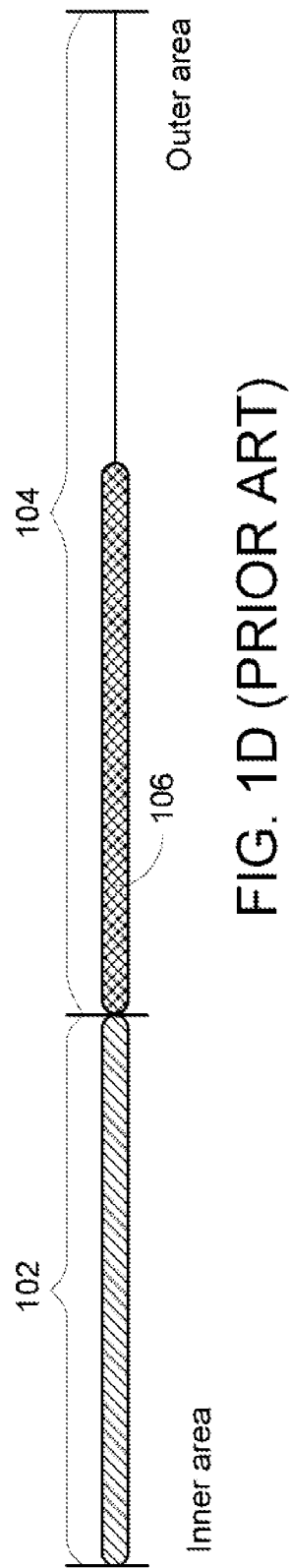
FIG. 1D is a schematic view using a straight line to represent a whole spiral track, corresponding to FIG. 1O.

According to specification of a blu-ray disc, the blu-ray disc is formatted to a sequential recorded media (SRM) and a plurality of sequential recorded regions (hereinafter short for SRR) are able to be opened. Data in each SRR must be recorded on a next writable address (hereinafter short for NWA).

Referring to FIG. 2, a track format of a blu-ray disc is shown. For example, an innermost area of the blu-ray disc is defined as inner zone 0, this area cannot be written with user data. A program area is next to the inner zone 0 and can be written with a user data. A lead-out area is next to the program area. In addition, a plurality of SRRs are able to be opened, such as two SRRs, a first SRR (SRR#1) and a second SRR (SRR#2). The second SRR (SRR#2) must adjacent to the first SRR (SRR#1). Moreover, the track of the blu-ray disc uses a physical sector number (hereinafter short for PSN) to represent an actual position on the track. An initial PSN of the inner area for writing data is 0x0100000. Furthermore, the inner zone 0 includes a table of content, wherein relative information of all SRRs, such as an initial PSN of a SRR and a final PSN of a SRR for recording data (Last recorded address, LRA), are recorded.

According to FIG. 2, an initial PSN of the first SRR (SRR#1) is 0x0100000, a final PSN of the first SRR (SRR#1) is 0xA. An initial PSN of the second SRR (SRR#2) is 0xA, a final PSN of the second SRR (SRR#2) is 0xB.

Data can be continuously written on the blu-ray disc start from an initial PSN of each SRR. According to the embodiment shown as FIG. 2, a front part of the first SRR (SRR#1), from PSN: 0x0100000 to PSN: 0xa1, is written with data, a rear part of the first SRR (SRR#1) is blank. Similarly, a front part of the second SRR (SRR#2), from PSN: 0xA to PSN: 0xb1, is written with data, a rear part of the second SRR (SRR#2) is blank. Blank areas of the first SRR (SRR#1) and the second SRR (SRR#2) can be used to write data again, and the data must be continually written after the PSN: 0xa1 or the PSN: 0xb1.

According to specification of a blu-ray disc, all SRRs must be aligned continually. Data in each SRR must be written from the least PSN. Each SRR can be further divided into a plurality of SRRs.

According to the embodiment of the present invention, by using the above characteristics of the blu-ray disc, a description data can be written from any selected radius positions on a blank area of the blu-ray disc. The detailed descriptions of the present invention are as follows.

According to specification of a blu-ray disc, an initial radius (defined as $r_{ref}$) of the innermost data of the blu-ray disc is 24 mm, a PSN of this position (defined as PSN_ref) is 0x0100000. A length of each PSN (defined as PSN_length) is 2.2399 mm. A track pitch (TP) is $320 \times 10^{-9}$ nm. Therefore, a PSN (defined as PSN_start) of any radius position (defined as $r_{start}$) must satisfy the following formula:

$$\text{PSN\_start} = \text{PSN\_ref} + \frac{\pi(r_{start}^2 - r_{ref}^2)}{\text{PSN\_length} \times TP}$$

In other words, a user can operate the label tag technology on any radius of blank area. Before operating the label tag technology, a SRR must be divided according to the PSN of the selected radius.

Figure 3C:
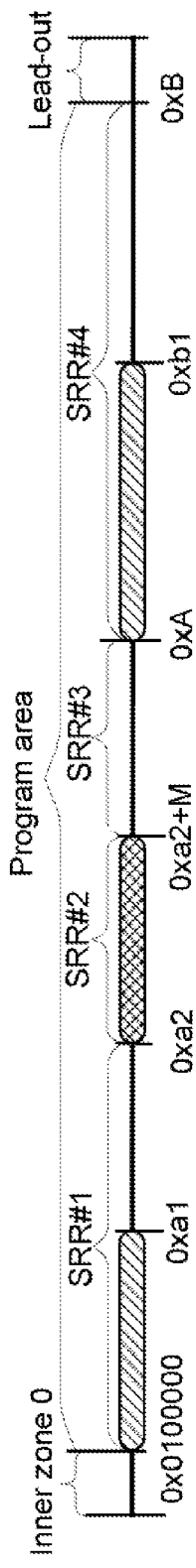

Referring to FIGS. 3A~C, FIGS. 3A~C are schematic views showing a SRR is divided by the labeling method for the blu-ray disc of the present invention. As shown in FIG. 3A, after the first SRR (SRR#1) and the second SRR (SRR#2) shown in FIG. 2 are formed, a user can write a description data from an initial radius ($r_{start}$). The PSN of the initial radius ($r_{start}$) is 0xa2 through calculation, and between the PSN: 0xa1 and PSN: 0xA.

As shown in FIG. 3B, suppose the description data will occupy a length of M PSNs, the original first SRR (SRR#1) is divided into three SRRs. After divided, a first SRR (SRR#1) is positioned between the PSN: 0x0100000 and PSN: 0xa2; a second SRR (SRR#2) is positioned between the PSN: 0xa2 and PSN: 0xa2+M; a third SRR (SRR#3) is positioned between the PSN: 0xa2+M and PSN: 0xA. In addition, the original second SRR (SRR#2) is renumbered as a fourth SRR (SRR#4). After the SRR is divided, relative information in the table of content of the inner zone 0 will be updated correspondingly.

As shown in FIG. 3C, after the SRR is divided, a disc drive can write the description data from the initial PSN: 0xa2 of the second SRR (SRR#2), according to the information in the table of content. When the action of image description is finished, the all description data is written on the second SRR (SRR#2), thus the label tag technology is completed.

Figure 3D:
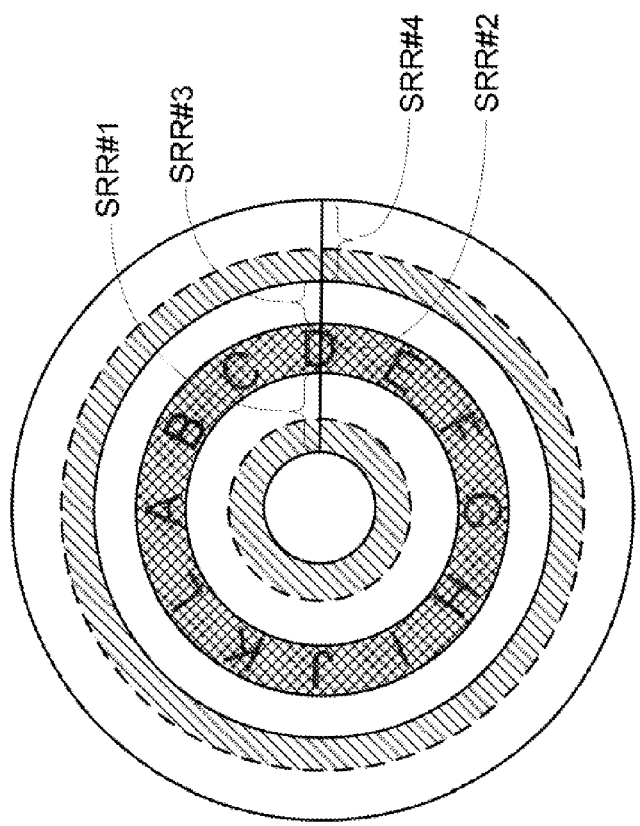

As shown in FIG. 3D, FIG. 3D is a schematic view showing a data side of the blu-ray disc after the label tag technology is completed. Wherein, the first SRR (SRR#1), the third SRR (SRR#3) and the fourth SRR (SRR#4) all have blank areas to write data. The image is positioned on a specific radius position according to the requirement of a user.

Figure 3E:
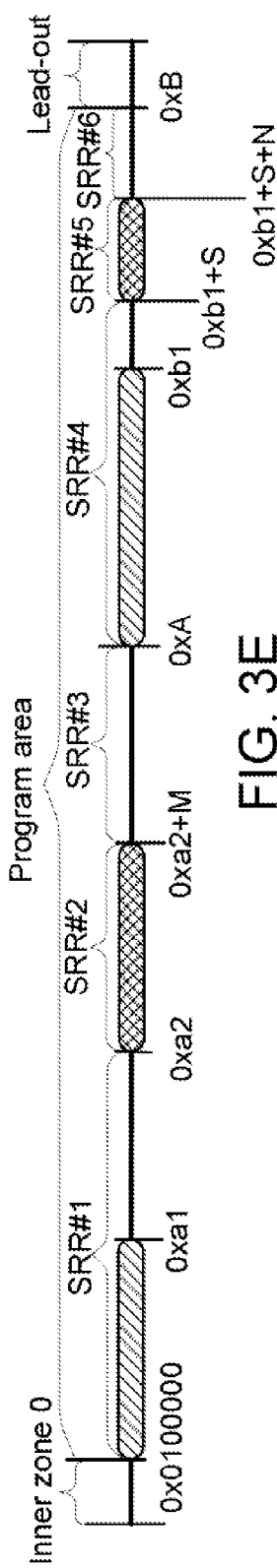

As shown in FIG. 3E, a new description pattern needs to be added by a user, a length of the pattern is N, the PSN of an initial radius ($r_{start}$) is 0xb1+S through calculation, which means the pattern is positioned between the PSN: 0xb1 and PSN: 0xB. The SRR needs to be redivided and renumbered. After redivided, a first SRR (SRR#1), a second SRR (SRR#2) and the third SRR (SRR#3) have same positions as the first, the second and the third SRRs shown in FIG. 3C. However, a fourth SRR (SRR#4) is positioned between the PSN: 0xA and PSN: 0xb1+S; a fifth SRR (SRR#5) is positioned between the PSN: 0xb1+S and PSN: 0xb1+S+N; a sixth SRR (SRR#6) is positioned between the PSN: 0xb1+S+N and PSN: 0xB. After the SRR is redivided, relative information in the inner zone 0 will be updated correspondingly. The new description pattern is positioned on the fifth SRR (SRR#5).

Figure 4:
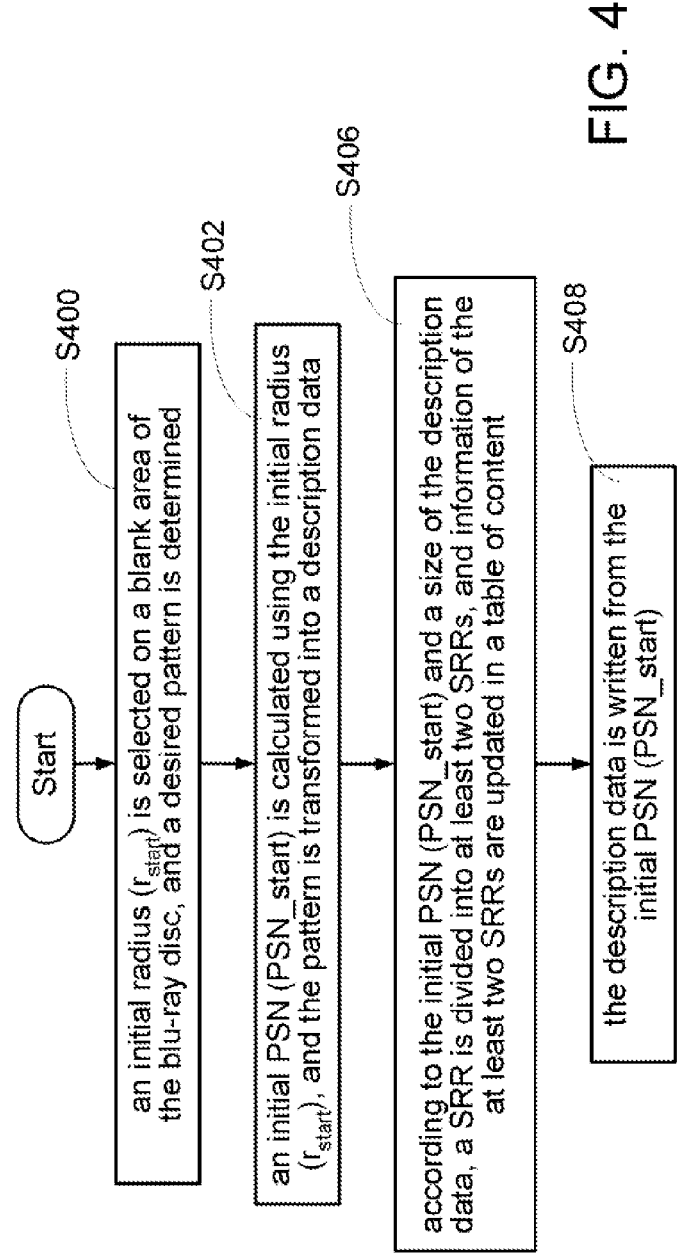
FIG. 4 is a flow chart of the labeling method for the blu-ray disc of the present invention.

Referring to FIG. 4, FIG. 4 is a flow chart of the labeling method for the blu-ray disc of the present invention. Firstly, an initial radius ($r_{start}$) is selected on a blank area of the blu-ray disc, and a desired pattern is determined (step S400). Secondly, an initial PSN (PSN_start) is calculated using the initial radius ($r_{start}$), and the pattern is transformed into a description data (step S402). Thirdly, according to the initial PSN (PSN_start) and a size of the description data, a SRR is divided into at least two SRRs, and information of the at least two SRRs are updated in a table of content (step S406), wherein an initial position of one of the SRRs is the initial PSN (PSN_start), and a length of the one of the SRRs is the size of the description data. Finally, the description data is written from the initial PSN (PSN_start) (step S408).

The above labeling method can be applied to a computer and a disc drive. A user inputs a desired pattern and an initial radius ($r_{start}$) on a user interface of the computer. The computer carries out the steps S402, S406 and S408. In other words, the pattern inputted by the user is transformed into a description data, and the initial PSN (PSN_start) is calculated out, then the description data and the initial PSN (PSN_start) are transmitted to the disc drive following a description command. When the disc drive receives the description command, the SRR of the blu-ray disc is divided according to the initial PSN (PSN_start) and the size of the description data. After divided, a new SRR is formed according to the size of the description data, and the description data is written on the new SRR. When all new SRRs of the blu-ray disc are formed and renumbered, the relative information of the SRRs (initial PSNs and final PSNs) are written in table of content in the inner zone 0.

In addition, a size of a blank area and a scope for showing an image can be provided by the computer at the beginning of the present invention, a user can input an initial radius ($r_{start}$) of a pattern accordingly. If the user inputs a wrong initial radius ($r_{start}$), in step S402, the computer will find that the initial PSN (PSN_start) calculated with the initial radius ($r_{start}$) is positioned on a written data area. So that, the computer will remind the user that he/she inputs the wrong initial radius ($r_{start}$) and he/she needs to input a new initial radius ($r_{start}$) again. Moreover, if the description data is larger than a writable area, which means the area written with the description data will overlays the written data area, the computer will remind the user to reselect an initial radius ($r_{start}$) of the pattern or amend the size of the pattern in step S402.

Using the present invention, the label tag technology of the blu-ray disc becomes more flexible, a pattern can be shown on any radius of the blu-ray disc except an area of written user data, and a SRR can be redivided and renumbered to meet the format of the blu-ray disc.

In the above labeling method for the blu-ray disc, a pattern data is written on a blank area, and an original SRR is divided into a plurality of new SRRs, then the pattern data is written into one of the new SRRs, therefore, the data in the original disc cannot be overlaid, reading data from the original disc is not affected.

The present invention also provides another labeling method for a blu-ray disc, the descriptions of the method are as follows.

Another labeling method for a blu-ray disc no needs to extra form a new SRR, but one of original SRRs is selected to write a pattern data. Referring to FIG. 5A, a blu-ray disc has two SRRs (SRR#1 and SRR#2), the first SRR (SRR#1) is selected to be written the pattern data, a size of the pattern is determined and the pattern is transformed into a description data, a disc drive writes the description data on the first SRR (SRR#1). The first SRR (SRR#1) has an original data positioned between the PSN: 0x0100000 and PSN: 0xa1, which means the final PSN for recording data (LRA) of the first SRR (SRR#1) is 0xa1. In this method, the description data must adjacent to the final PSN for recording data (LRA), so that an initial PSN of the description data is 0xa1, and a final PSN of the description data is 0xa1+H, wherein the H is a length of the description data and H must be less or equal to the length between PSN:0xa1 and PSN:0xA. After the description data is written, the final PSN (LRA) of the first SRR (SRR#1) is amended to the final PSN of the description data (0xa1+H) and is updated in a table of content.

Referring to FIG. 5B, FIG. 5B is a schematic view showing the SRR of the disc after the description data is written. In FIG. 5B, the disc also has two SRRs, the description data is written adjacent to the original data in the first SRR (SRR#1).

Therefore, another embodiment of the present invention no needs to extra form a new SRR, and when recording a description data, the description data is written adjacent to a final PSN (LRA) of the selected SRR.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A labeling method for a blu-ray disc comprising:
   selecting an initial radius on a blank area of the blu-ray disc, and determining a pattern;
   calculating an initial physical sector number using the initial radius, and transforming the pattern into a description data, wherein the initial physical sector number is determined by a computer using a formula:

$$\text{PSN\_start} = \text{PSN\_ref} + \frac{\pi(r_{start}^2 - r_{ref}^2)}{\text{PSN\_length} \times TP}$$

wherein the PSN start represents the initial physical sector number, the PSN ref represents a reference physical sector number, the $r_{ref}$ represents a reference radius, the PSN length represents a length of a single physical sector number, the TP represents a track itch of the blu-ray disc, the $r_{start}$ represents the initial radius;

dividing a sequential recorded region of the blu-ray disc into at least two sequential recorded regions according to the initial physical sector number and a size of the description data, and updating information of the at least two sequential recorded regions in a table of content, wherein an initial position of one of the sequential recorded regions is the initial physical sector number, and a length of the one of the sequential recorded regions is the size of the description data; and writing the description data from the initial physical sector number.

2. The labeling method for the blu-ray disc as claimed in claim 1, wherein the table of content is positioned in an inner zone 0 of the blu-ray disc.

3. The labeling method for the blu-ray disc as claimed in claim 1, wherein the reference physical sector number is 0x0100000, the reference radius is 24 mm, the track pitch is $320 \times 10^{-9}$ nm, the PSN_length is 2.2399 mm.

4. The labeling method for the blu-ray disc as claimed in claim 1, after the sequential recorded region is divided into the at least two sequential recorded regions, all sequential recorded regions on the blu-ray disc are renumbered, and information of the renumbered sequential recorded regions are updated in the table of content.

5. The labeling method for the blu-ray disc as claimed in claim 4, wherein the information of the sequential recorded regions comprise initial physical sector numbers and final physical sector numbers of the sequential recorded regions.

6. The labeling method for the blu-ray disc as claimed in claim 1, further comprising: providing a size of a blank area and a scope for showing an image, and determining the initial radius according to the size of the blank area and the scope for showing the image.

7. The labeling method for the blu-ray disc as claimed in claim 1, further comprising: stopping writing the description data, if the description data is larger than a length of a writable sequential recorded region.

* * * * *